(12) United States Patent
Kim (10) Patent No.: US 8,264,334 B2
(45) Date of Patent: Sep. 11, 2012

(54) REMOTE CONTROL UNIT, ELECTRONIC DEVICE AND METHOD FOR CONTROLLING ELECTRONIC DEVICE

(75) Inventor: In Hui Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 871 days.

(21) Appl. No.: 12/029,021

(22) Filed: Feb. 11, 2008

(65) Prior Publication Data

US 2008/0136684 A1    Jun. 12, 2008

Related U.S. Application Data (63) Continuation of application No. 10/968,075, filed on Oct. 20, 2004, now Pat. No. 7,388,536.

(30) Foreign Application Priority Data

Oct. 20, 2003  (KR) .................................. 2003-72846

(51) Int. Cl.
*G05B 11/01* (2006.01)
(52) U.S. Cl. .................................................. 340/12.22
(58) Field of Classification Search ............. 340/825.69, 340/12.22, 5.64, 426.13; 345/173
See application file for complete search history.

(56) References Cited

U.S. PATENT DOCUMENTS

| 4,890,108 A * | 12/1989 | Drori et al. ..................... 341/176 |
| 6,198,513 B1 | 3/2001 | Cherrick ........................ 348/731 |
| 6,744,422 B1 | 6/2004 | Schillings et al. ............. 345/169 |
| 6,750,782 B1 | 6/2004 | Byun ........................ 340/825.72 |
| 7,013,434 B2 * | 3/2006 | Masters et al. ................. 715/840 |
| 7,013,478 B1 * | 3/2006 | Hendricks et al. .............. 725/46 |
| 2003/0122698 A1 | 7/2003 | Horie et al. .................... 341/176 |

FOREIGN PATENT DOCUMENTS

| CN | 2416693 | 1/2001 |
| CN | 1366293 | 8/2002 |
| KR | 97-011265 | 7/1997 |
| KR | 10-0140962 | 3/1998 |

OTHER PUBLICATIONS

Chinese Office Action dated Apr. 11, 2008 (with English-language translation).
Korean Notice of Allowance dated Nov. 30, 2010 for Application 10-2003-0072846.
Chinese Office Action dated Jul. 6, 2007 (and English translation) for Application 200410087747.1.

* cited by examiner

*Primary Examiner* — Vernal Brown
(74) *Attorney, Agent, or Firm* — KED & Associates, LLP (57) ABSTRACT

A remote control unit, an electronic device and a method for controlling an electronic device using the same are provided. The remote control unit includes: a key input part including a menu key for allowing an electronic device to enter a setup mode, a numeric key rotatably provided to display different numerals depending on degree of rotation, and a confirm key for transmitting a control signal corresponding to the numeral of the numeric key; a memory for storing a control code for controlling the electronic device; a microcomputer for reading out and transmitting the control code stored in the memory depending on a signal inputted from the key input part; and an infrared transmitter for transmitting the control code in a form of an infrared signal depending on a control of the microcomputer.

20 Claims, 11 Drawing Sheets

FIG.1

(RELATED ART)

REMOTE CONTROL UNIT, ELECTRONIC DEVICE AND METHOD FOR CONTROLLING ELECTRONIC DEVICE

This application is a Continuation of U.S. patent application Ser. No. 10/968,075, filed Oct. 20, 2004, now U.S. Pat. No. 7,388,536, which claims priority to Korean Application No. 72846/2003, filed Oct. 20, 2003. The entire disclosures of the prior applications are hereby incorporated by reference.

BACKGROUND OF THE INVENTION

1. Field of the Invention

The present invention relates to a remote control unit, an electronic device and a method for controlling an electronic device, and more particularly, to a remote control unit, an electronic device and a method for controlling an electronic device, in which the electronic device is controlled by a combination of numeric keys.

2. Description of the Related Art

In general, an input key provided at an outside of an electronic device or a remote control unit provided together with the electronic device is used to control the electronic device, such as a display device and an audio device.

In recent years, as a function of the electronic device is diversified and complicated, many input keys are provided at the remote control unit so as to control the electronic device. Accordingly, the design of the remote control unit is difficult and coarse.

Figure 1:
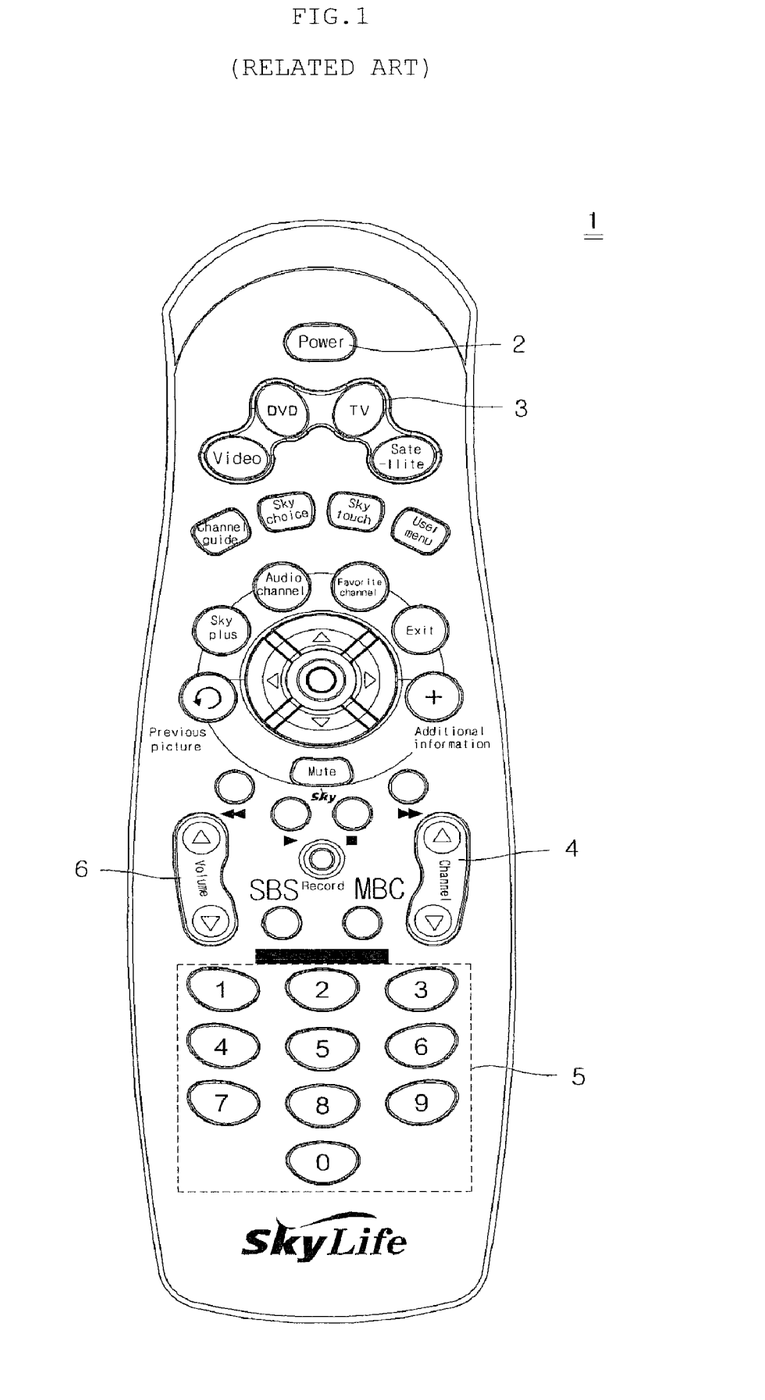
FIG. 1 is a view of a remote control unit according to the related art.

FIG. 1 is an exemplary view of a remote control unit according to the related art.

Referring to FIG. 1, a remote control unit 1 includes a variety of input keys, including a power key 2, a device selection key 3, a channel key 4, a volume key 6, a numeric key 5 and so on.

Accordingly, the design of the remote control unit 1 is complicated and persons who are unskilled in the control of the electronic device are reluctant to use the remote control unit 3.

Meanwhile, it is impossible to provide all input keys capable of controlling the electronic device on the remote control unit 1.

For example, in the case of the display device, a setup mode is provided to control channel information, video information, audio information and so on according to the user's taste.

The user can set the display device to the setup mode and control the setup of the electronic device through the input key of the remote control unit 1.

However, as various control options of the display device are provided, a plurality of input keys are formed on the remote control unit 10 and it is difficult for the user to know which input key must be inputted for a desired control.

Also, there occurs a problem in that the remote control unit becomes large in size so as to form a plurality of input keys thereon.

SUMMARY OF THE INVENTION

Accordingly, the present invention is directed to a remote control unit that substantially obviates one or more problems due to limitations and disadvantages of the related art.

An object of the present invention is to provide a remote control unit for controlling an electronic device, which is capable of simplifying an input key of the remote control unit. The remote control unit has a numeric key and transmits a specific control unit provided by a combination of numerals.

Also, the electronic device displays a key, which must be inputted for control of the electronic device, in a numeral form using an on-screen display (OSD). If a key corresponding to the numeral is inputted from the remote control unit, a corresponding control operation is executed.

Another object of the present invention is to provide a method for controlling an electronic device using the OSD and the remote control unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a remote control unit including: a key input part including a menu key for allowing an electronic device to enter a setup mode, a numeric key rotatably provided to display different numerals depending on degree of rotation, and a confirm key for transmitting a control signal corresponding to the numeral of the numeric key; a memory for storing a control code for controlling the electronic device; a microcomputer for reading out and transmitting the control code stored in the memory depending on a signal inputted from the key input part; and an infrared transmitter for transmitting the control code in a form of an infrared signal depending on a control of the microcomputer.

According to the present invention, a remote control unit includes: a key input part including a menu key for allowing an electronic device to enter a setup mode, a numeric key for providing different numerals depending on an input number of the numeric key, a display part for displaying a numeral depending on the input number of the numeric key, and a confirm key for transmitting a control signal corresponding to the numeral displayed on the display part; a memory for storing a control code for controlling the electronic device; a microcomputer for reading out and transmitting the control code stored in the memory depending on a signal inputted from the key input part; and an infrared transmitter for transmitting the control code in a form of an infrared signal depending on a control of the microcomputer.

According to the present invention, a remote control unit includes a key input part having an input key for controlling an electronic device, a memory for storing a control code for controlling the electronic device, a microcomputer for reading out and transmitting the control code stored in the memory depending on a signal inputted from the key input part, and an infrared transmitter for transmitting the control code in a form of an infrared signal depending on a control of the microcomputer, wherein the key input part includes a numeric key rotatably provided to display a numeral depending on degree of rotation.

According to the present invention, a remote control unit includes a key input part having an input key for controlling an electronic device, a memory for storing a control code for controlling the electronic device, a microcomputer for reading out and transmitting the control code stored in the memory depending on a signal inputted from the key input part, and an infrared transmitter for transmitting the control code in a form of an infrared signal depending on a control of the microcomputer, wherein the key input part includes: a numeric key providing different numerals depending on an input number of the numeric key; and a display part for displaying the numerals depending on the input number of the numeric key.

According to the present invention, an electronic device includes: a key input part formed at an outer surface of the electronic device, for transmitting a control signal to a microcomputer of the electronic device depending on a key input of a user, wherein the key input part includes a numeric key rotatably provided to display different numerals depending on degree of rotation.

According to the present invention, an electronic device includes: a key input part formed at an outer surface of the electronic device, for transmitting a control signal to a microcomputer of the electronic device depending on a key input of a user, wherein the key input part includes: a numeric key providing different numerals depending on an input number of the numeric key; and a display part for displaying the numerals depending on the input number of the numeric key.

According to the present invention, a method for controlling an electronic device includes the steps of: inputting a menu key formed on an electronic device or a remote control unit; allowing the electronic device to enter a setup mode depending on the input of the menu key; inputting a predetermined numeral to a numeric key; and inputting a confirm key of the electronic device or the remote control unit, and transmitting a control signal corresponding to a numeral inputted to the numeric key, thereby achieving a setup of the electronic device.

According to the present invention, a method for controlling an electronic device includes the steps of: displaying a predetermined numeral by rotating a numeric key, the numeric key being rotatably provided in a key input part of an electronic device or a remote control unit to display a numeral depending on degree of rotation; and transmitting a control signal representing a numeral depending on an input of a confirm key, thereby achieving a control operation of the electronic device.

According to the present invention, a method for controlling an electronic device includes the steps of: displaying a predetermined numeral by inputting a numeric key by predetermined times depending on an input number of the numeric key, the numeric key being provided in a key input part of an electronic device or a remote control unit; and transmitting a control signal representing a numeral depending on an input of a confirm key, thereby achieving a control operation of the electronic device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A remote control unit, an electronic device and a method for controlling the electronic device according to the present invention will now be described in detail with reference to the accompanying drawings.

Figure 2:
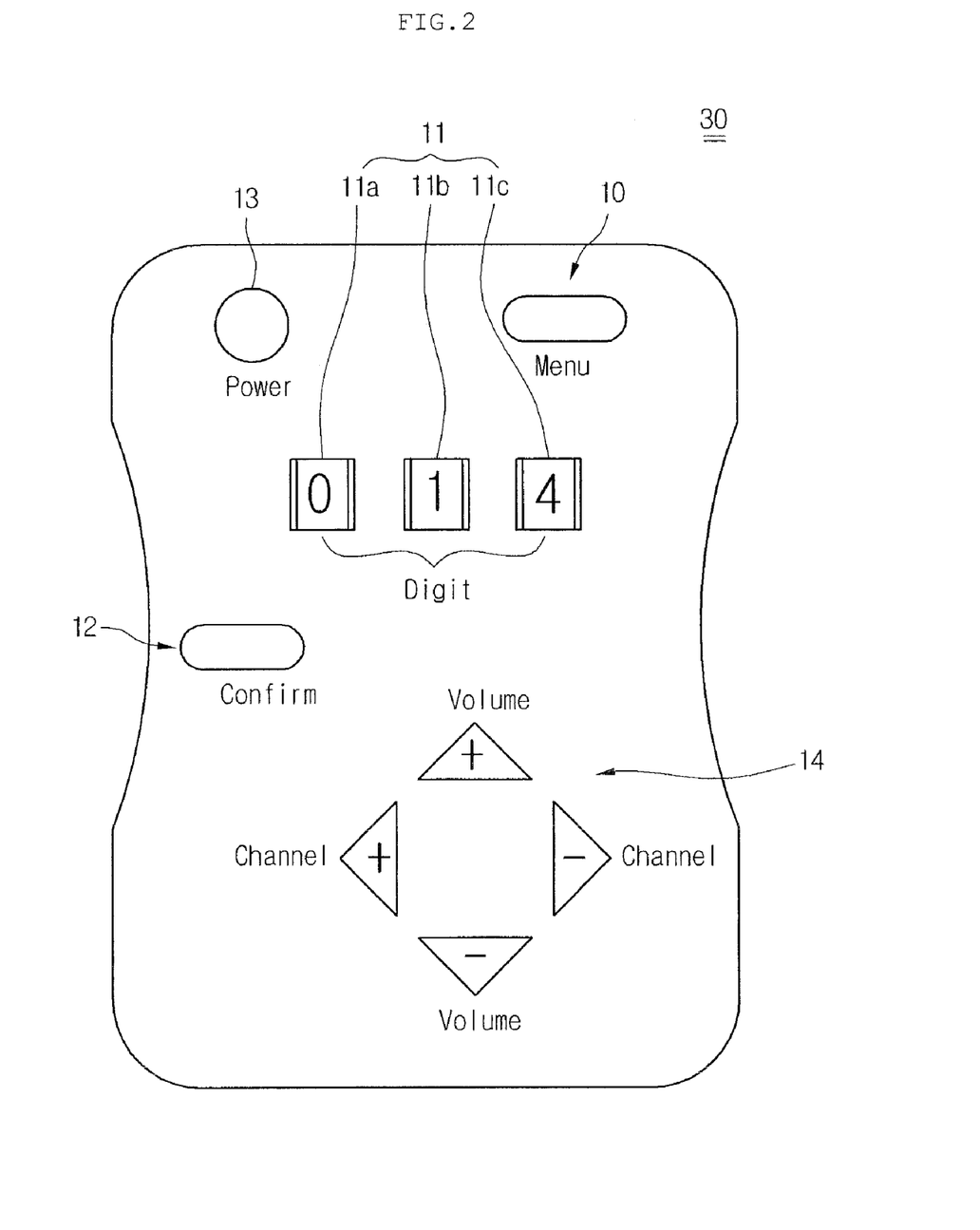
FIG. 2 is a view illustrating an outer appearance a remote control unit according to the related art.
Figure 3:
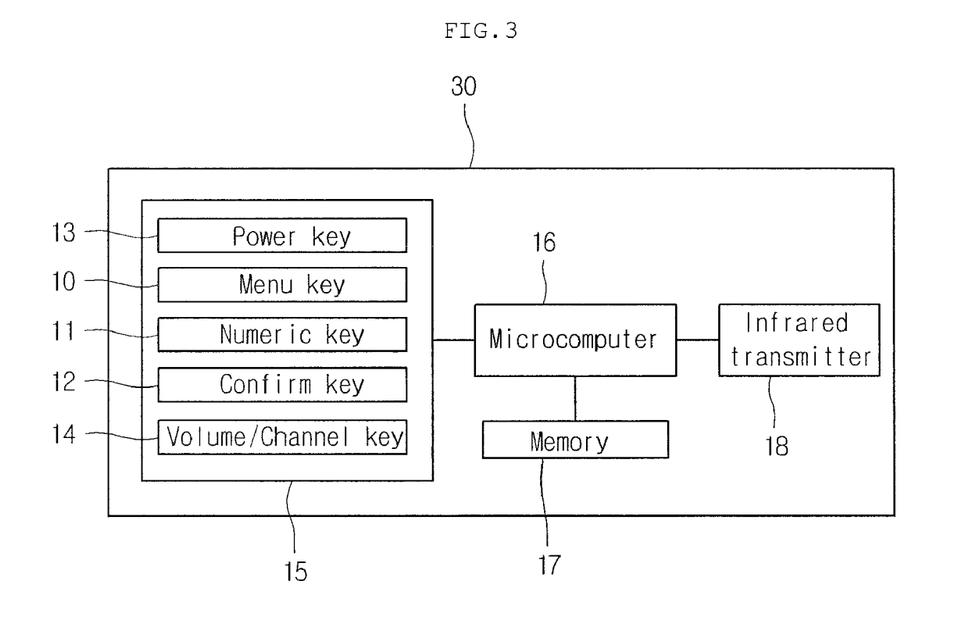
FIG. 3 is a view illustrating a structure of a remote control unit according to the present invention.

FIG. 2 is a view illustrating an outer appearance of a remote control unit according to the related art, and FIG. 3 is a view illustrating a structure of the remote control unit shown in FIG. 2.

Referring to FIGS. 2 and 3, a remote control unit 30 according to the present invention includes a key input part 15, a microcomputer 16, a memory 17, and an infrared transmitter 18.

The key input part 15 is provided on the remote control unit 30 and includes a variety of control keys for controlling an electronic device. The key input part 15 is coupled to the microcomputer 16 through a key scan port and enables the microcomputer 16 to recognize a user's key input.

In detail, the key input part 15 includes: a power key 13 for turning on/off power of the electronic device; a menu key 10 for setting a setup mode of the electronic device; a numeric key 11 for allowing a control signal to be inputted in the setup mode of the electronic device and controlling a volume and a channel selection; a confirm key 12 for transmitting a control command selected by the numeric key 11; and a volume/channel key 14 for controlling a volume and a channel selection.

The memory 17 stores a program for operation of the remote control unit 30 and a control code corresponding to the inputted key.

The microcomputer 16 controls the operation of the remote control unit 30 and reads out the control code corresponding to the inputted key from the memory 17, allowing an infrared control signal to be transmitted to the electronic device through the infrared transmitter 18.

In more detail, the menu key 10 is used as an input key allowing the electronic key to enter the setup mode, and the confirm key 12 allows the transmission of the control code corresponding to the numeric key 11 inputted by the user.

Although the infrared control signal is described above, the control signal can also be an RF signal or electrical signal.

Figure 4:
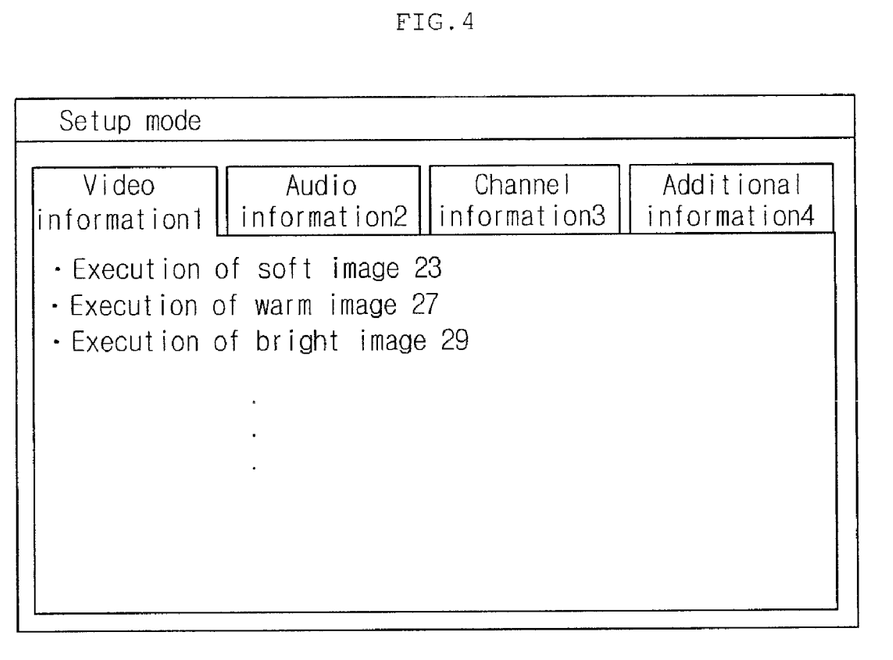
FIG. 4 is a view of an on-screen display (OSD) for control of an electronic device.

FIG. 4 is an exemplary view of an on-screen display (OSD) displayed on a screen of the electronic device.

If the menu key 10 is inputted, the setup mode for control of the electronic device is displayed on a screen of the electronic device, as shown in FIG. 4.

As one embodiment, a menu that can control video information is displayed. If the menu key 10 is again inputted, the menu displayed on the screen may be changed into audio information, channel information or additional information.

That is, a desired menu can be displayed by combination of the menu key 10 and other keys or by repetitive inputs of the menu key 10. Numerals for specific commands are displayed on the menu.

For example, "23" must be inputted for the execution of soft image, and "29" must be inputted for the execution of bright image.

Here, the numerals are inputted through the numeric key 11 of the remote control unit 30.

As shown, the numerals may be displayed on the menu. A desired control can be executed by inputting the numerals through the numeric key 11 formed on the remote control unit 30.

If the user inputs "123" through the menu key 10, a soft image is directly displayed. Also, if the user inputs "1" and then "23", the same operation is performed.

Further, a specific menu can be selected by moving a cursor displayed on the OSD menu through the volume/channel key 14 of the remote control unit 30.

The numeric key 11 of the remote control unit 30 may include unit-position numeric key 11c and 10's-position numeric key 11b, preferably 100's-position numeric key 11a. That is, at least one numeric key 11 may be provided at the remote control unit 30.

The numeric key 11 is a rotatable input key on which digits 0-9 are written.

The numeric key 11 has a rotational shaft disposed in a width direction of the remote control unit 30. If the numeric key 11 is pushed or pulled in a length direction (up and down), numerals larger or smaller than the displayed numeral appear in sequence.

Accordingly, the numeral displayed on the menu can be exhibited on the numeral key 11 through the manipulation of the numeral key 11.

When the user knows the numerals that must be inputted for the control, the numerals need not be inputted on the OSD menu.

Meanwhile, after the specific numeral is exhibited on the numeric key 11, the confirm key 12 is inputted.

The confirm key 12 allows the control code, which corresponds to the numeral exhibited on the numeric key 11, to be read out from the memory 17 and transmitted to the electronic device through the infrared transmitter 18.

Accordingly, the electronic device receives the control signal from the remote control unit 30 and operates in a mode desired by the user.

Meanwhile, the volume/channel key 14 may be set additionally for user convenience. The volume, the channel and so on can also be controlled using only the numeric key 11.

For example, the numerals exhibited on the numeric key 11 may be used as the channel number or volume level.

If the channel number is inputted in the numeric key 11 and the confirm key 12 is pressed, a control signal for moving to a corresponding channel is transmitted.

Figure 5:
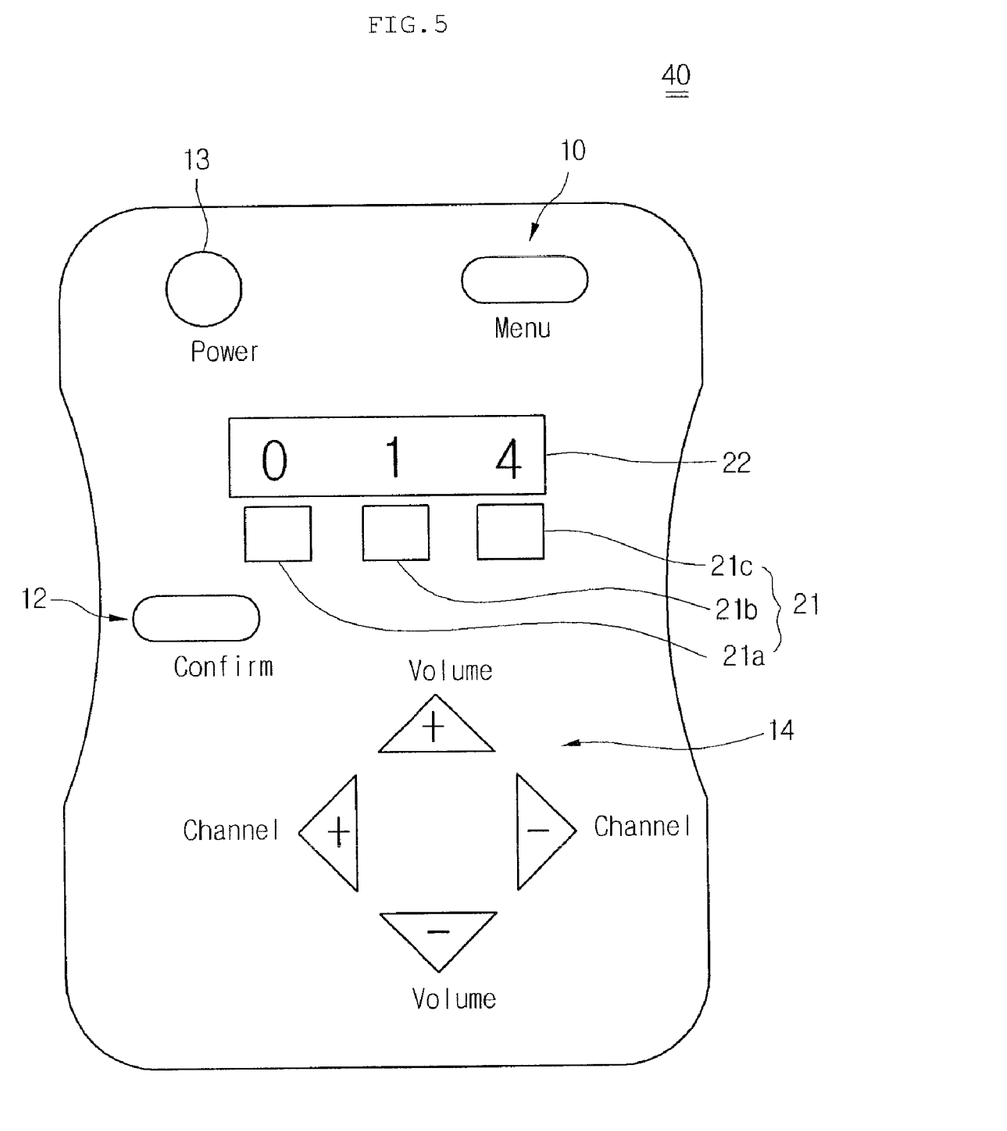
FIG. 5 is a view illustrating an outer appearance of a remote control unit according to a second embodiment of the present invention.
Figure 6:
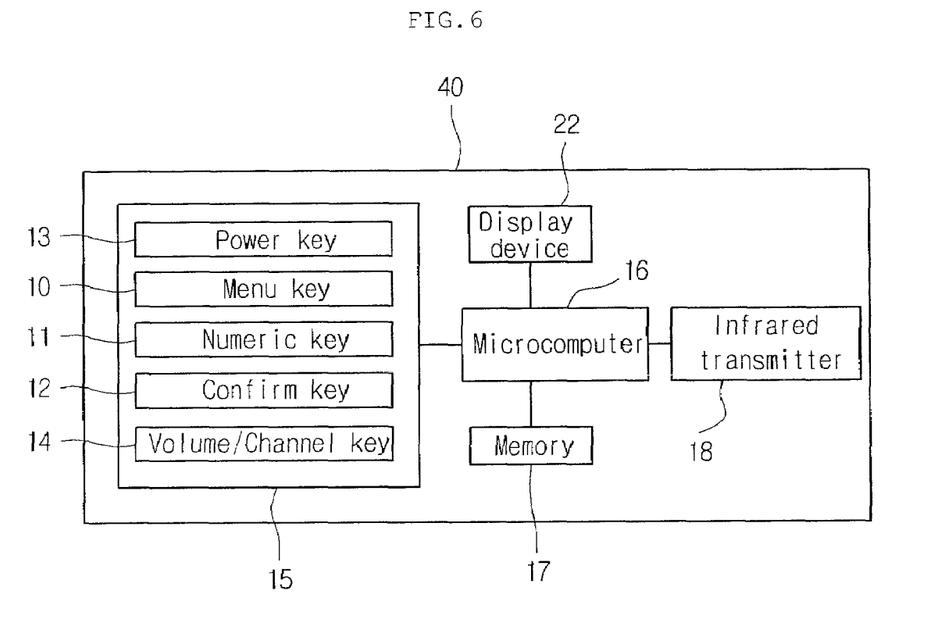
FIG. 6 is a view illustrating a structure of the remote control unit according to the second embodiment of the present invention.

FIG. 5 is a view illustrating an outer appearance of a remote control unit according to a second embodiment of the present invention, and FIG. 6 is a view illustrating a construction of the remote control unit according to the second embodiment of the present invention.

The remote control unit of FIGS. 5 and 6 is basically similar to that of FIGS. 2 and 3.

A difference is that a structure of the numeric key 21 is different and a display device 22 is additionally provided.

At least one numeric key 21 is provided. That is, two numeric keys may be provided, or three numeric keys may be provided as shown in FIG. 5.

A meaning of the numeral is different depending on the pressing number of the numeric key 21.

For example, if the unit-position numeric key 21c is pressed one time, it means a numeral "1", and if the unit-position numeric key 21c is pressed two times, it means a numeral "2".

If the unit-position numeric key 21c is pressed nine times, it means a numeral "9", and if the unit-position numeric key 21c is pressed ten times, it means a numeral "0".

An LCD panel may be used as the display device 22 of the remote control unit 40. The display device 22 displays the numeral that is meant by the pressing number of the numeric key 21.

In the example shown in FIG. 5, "014" is displayed on the display device 22. It means that 100's-position numeric key 21a is not pressed or pressed ten times, 10's-position numeric key 21b is pressed one time, and unit-position numeric key 21c is pressed four times.

Meanwhile, as shown in FIGS. 2 and 3, the confirm key 12 of the remote control unit 40 is inputted after a specific numeral is displayed on the numeric key 21, the confirm key 12 reads out a corresponding control code from the memory 17 and transmits it to the electronic device through the infrared transmitter 18.

Accordingly, the electronic device receives the control signal from the remote control unit 40 and operates a desired operation.

Figure 7:
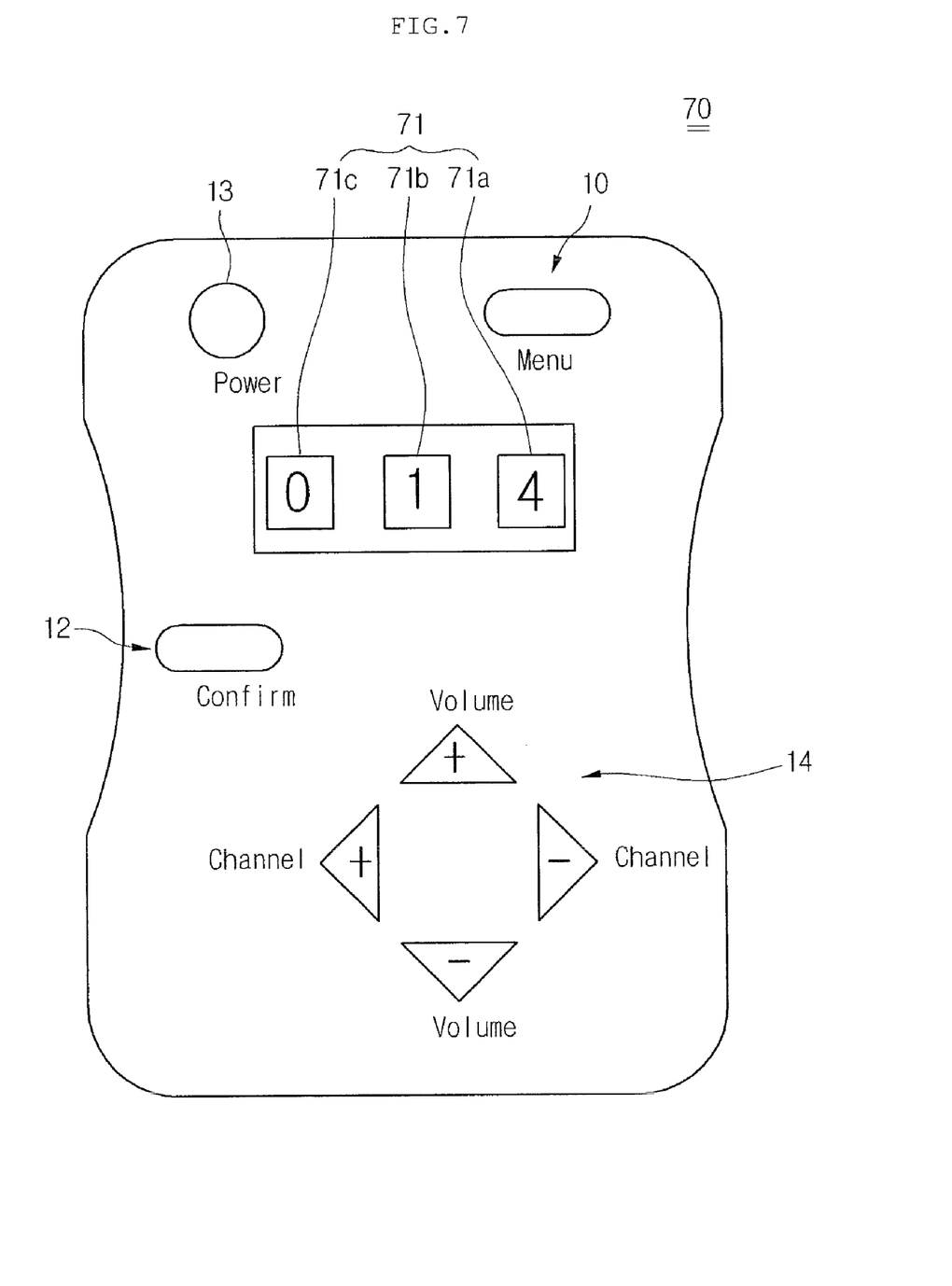
FIGS. 7 and 8 are views illustrating embodiments similar to the embodiment of FIG. 5.
Figure 8:
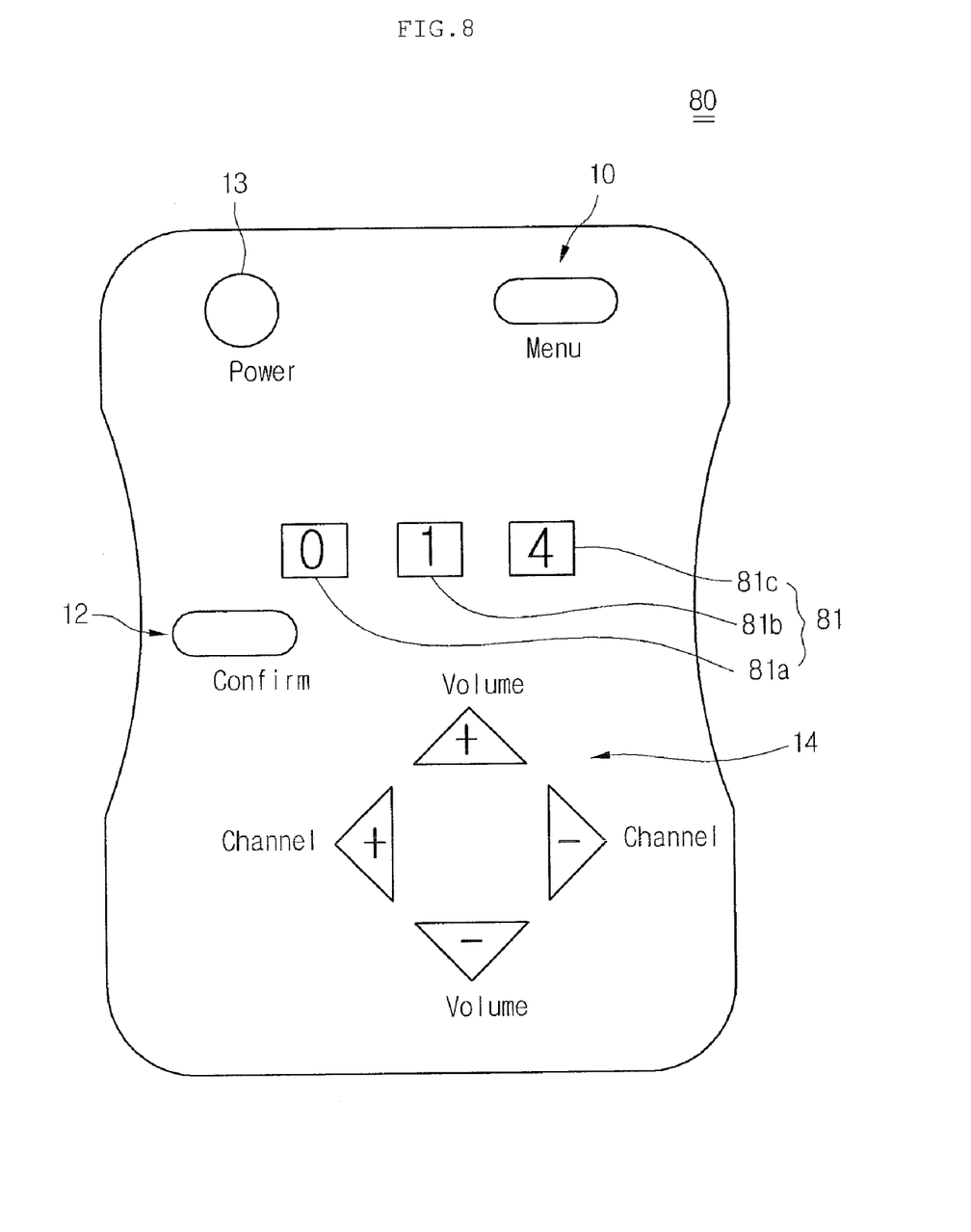

FIGS. 7 and 8 are views for explaining the embodiment similar to the embodiment of FIG. 5.

The embodiments of FIGS. 7 and 8 have the same basic construction as the embodiment of FIG. 5.

However, in FIGS. 7 and 8, the numeric keys 71 and 81 are provided with a touch screen. Thus, the numeric keys 71 and 81 also act as the display device.

In the case of the numeric key 71 shown in FIG. 7, regions for 100's-position numeric key 71c, 10's-position numeric key 71b and unit-position numeric key 71a are divided on one touch screen.

In the case of the numeric key 81 shown in FIG. 8, three touch screens are provided such that 100's-position numeric key 81c, 10's-position numeric key 81b and unit-position numeric key 81a are displayed thereon.

The touch screens for the numeric keys 71 and 81 are connected to the microcomputer of the remote control units 70 and 80 such that different numerals are displayed depending on the pressing number of the key.

Figure 9:
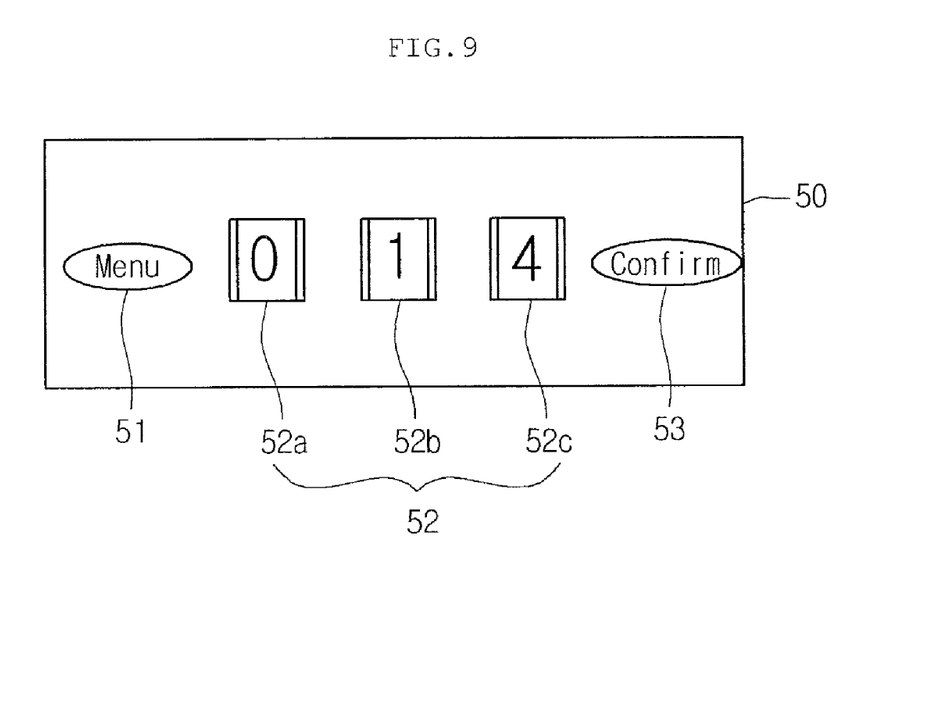
FIGS. 9 and 10 are views illustrating other embodiments of the present invention.
Figure 10:
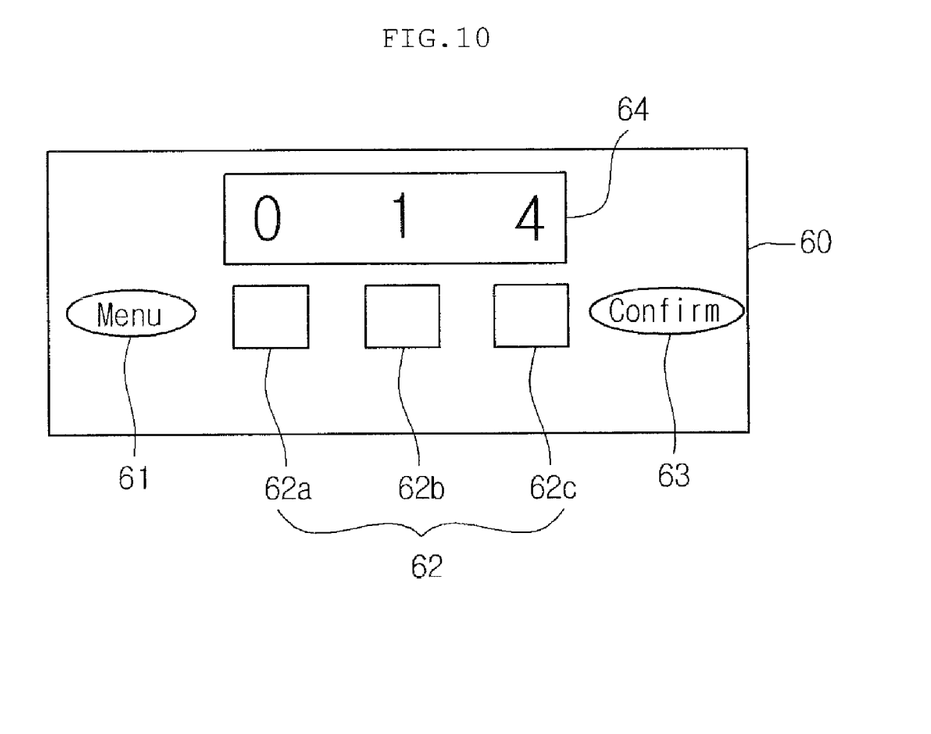

FIGS. 9 and 10 are views of a key input part according to other embodiments of the present invention.

In FIGS. 9 and 10, there are shown key input part 50 and 60 formed on a front or upper side of the electronic device.

As described in FIGS. 2 and 5, the key input parts 50 and 60 include numeric keys 52 and 62, display parts 64, confirm keys 53 and 63, and menus 51 and 61, respectively.

The key input parts 50 and 60 are connected to the microcomputer of the electronic device such that the electronic device is controlled depending on the key input.

As described in FIG. 2, the numeric key 52 is a rotatable input key on which digits 0-9 are written. Also, as described in FIG. 5, the numeric key is provided to display different numerals depending on the pressing number of the key.

The confirm keys 53 and 63 and the menu keys 51 and 61 perform the same operation described in FIGS. 2 and 5.

That is, it is apparent that the present invention of FIGS. 9 and 10 is not limited to the remote control unit and can be applied to the key input parts 50 and 60.

Figure 11:
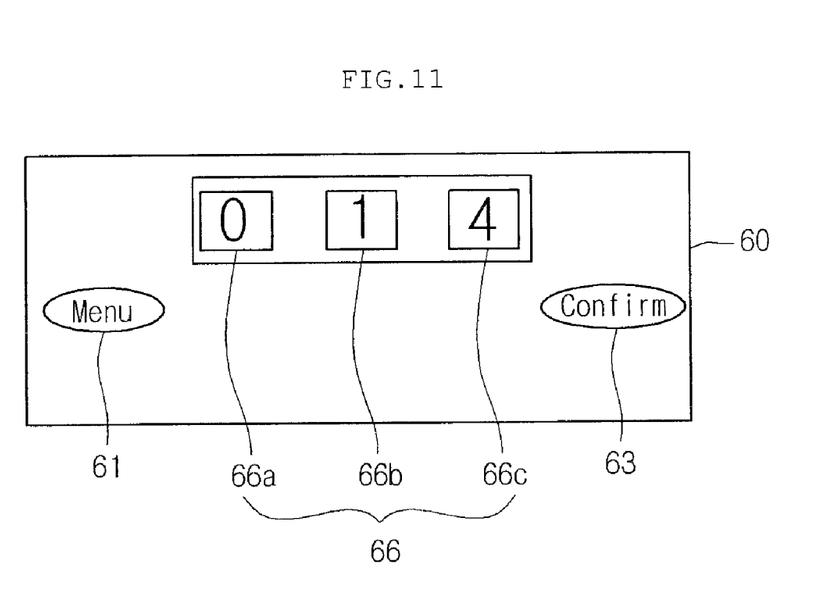
FIGS. 11 and 12 are views illustrating further other embodiments of the present invention.
Figure 12:
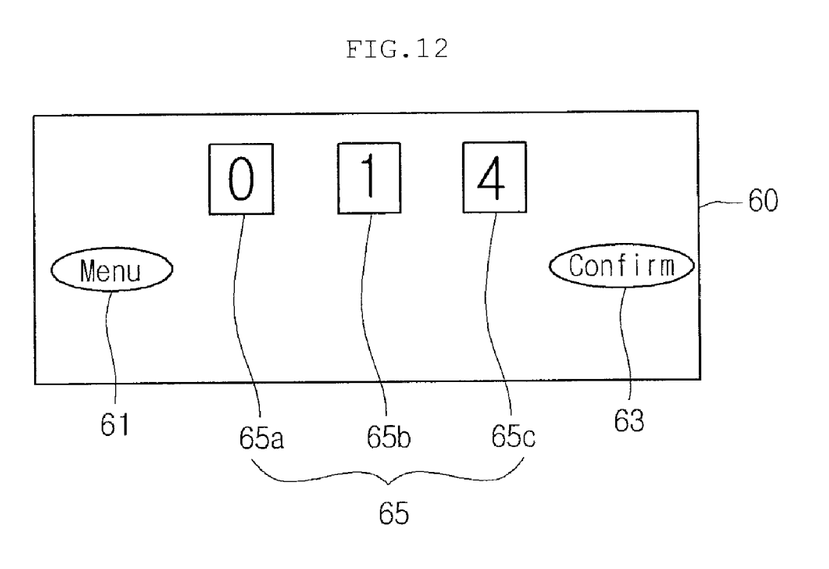

Also, the embodiments of FIGS. 11 and 12 are similar to those of FIGS. 7 and 8.

That is, the numeric keys 65 and 66 are provided with the touch screens on the key input part of the electronic device and thus the numeric keys also act as the display part.

In the case of the numeric key 65 shown in FIG. 11, regions for 100's-position numeric key 71c, 10's-position numeric key 71b and unit-position numeric key 71a are divided on one touch screen.

In the case of the numeric key shown in FIG. 12, three touch screens for 100's-position numeric key 66c, 10's-position numeric key 66b and unit-position numeric key 66a are provided on the three touch screens.

The touch screens for the numeric keys 65 and 66 are connected to the microcomputer such that the different numerals are displayed depending on the pressing number of the key.

Figure 13:
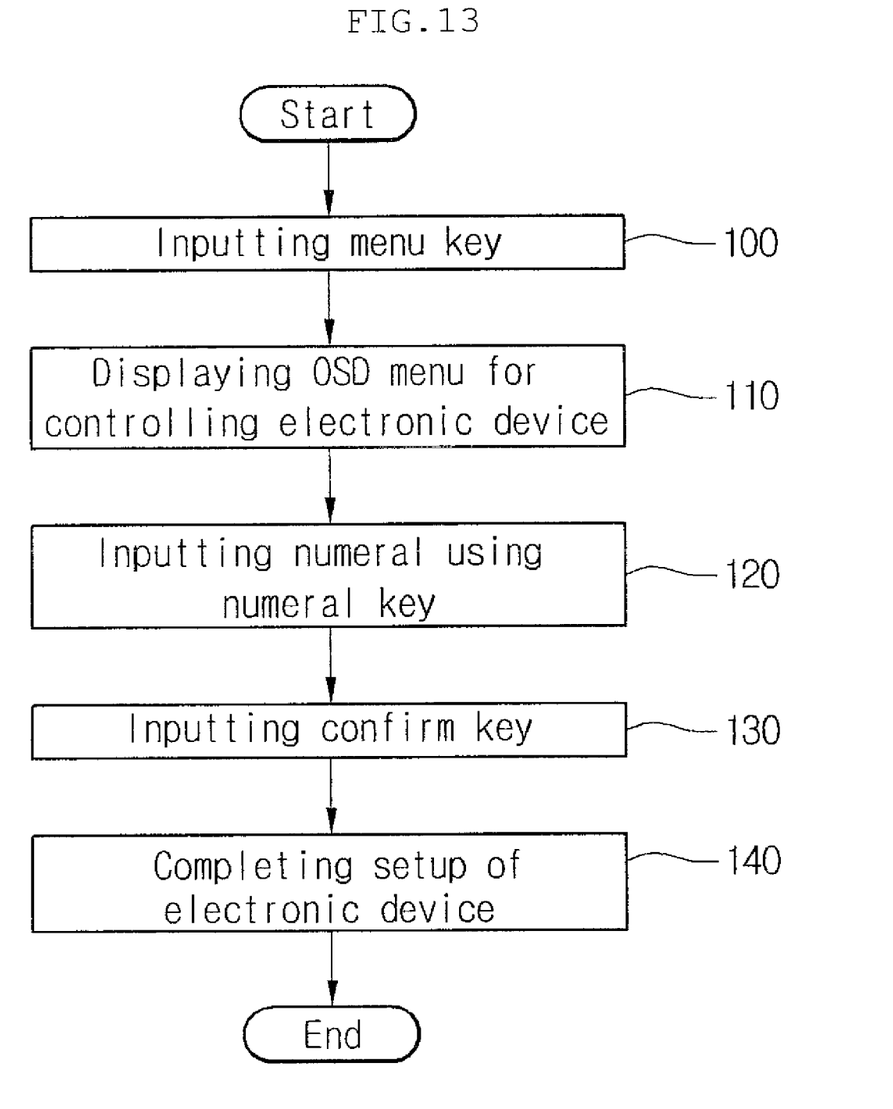
FIG. 13 is a flowchart illustrating a method for controlling an electronic device according to the present invention.

FIG. 13 is a flowchart illustrating a method for controlling an electronic device according to the present invention.

Referring to FIG. 13, the user inputs the menu key (Step 100). Due to the input of the menu key, the electronic device enters the setup mode.

Then, the OSD menu for control of the electronic device is displayed (Step 110).

A setup item and a numeral for the setup are displayed on the OSD menu. The setup item includes video information, audio information, channel information and additional information.

Using the numeric key of the remote control unit, the user inputs the numeral corresponding to the desired setup item (Step 120) and then inputs the confirm key (Step 130).

Here, the numeric key may be a rotatable input key on which digits 0-9 are written and may be an input key that displays different numerals depending on the pressing number of the key.

As the confirm key is inputted, the remote control unit reads out the control code corresponding to the numeral and transmits it in a format of the infrared signal. The electronic device receives the infrared signal and operates in a mode desired by the user.

According to the present invention, the OSD menu for control of the electronic device is exhibited with the numeral on the OSD and the numeral is transmitted by manipulation of the numeric key. Therefore, the electronic device can be simply controlled.

Specifically, since the remote control unit according to the present invention can greatly reduce the number of the input keys, it is easy to manufacture and manipulate the remote control unit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A remote control unit comprising:
    a key input part including a menu key for allowing an electronic device to enter a setup mode, a plurality of numeric keys for providing different multi-digit numerals depending on input of the numeric keys, a display part for displaying a multi-digit numeral depending on the input of the numeric keys, and a confirm key for transmitting a control signal corresponding to the multi-digit numeral displayed on the display part, wherein the display part displays different multi-digit numerals according to a number of times that each of the numeric keys is pressed;
    a memory for storing a control code for controlling the electronic device;
    a microcomputer for reading out and transmitting the control code stored in the memory depending on a signal inputted from the key input part; and
    an infrared transmitter for transmitting the control code in a form of an infrared signal depending on a control of the microcomputer,
    wherein the multi-digit numeral is separated into two parts, a first one of the two parts corresponds to a menu item selected from among a plurality of menu items for controlling the electronic device, and a second one of the two parts corresponds to a control operation selected from among a plurality of control operations included in the selected menu items.

2. The remote control unit according to claim 1, wherein the numeric keys include two numeric keys representing the tens digit and the units digit, respectively.

3. The remote control unit according to claim 1, wherein the numeric keys include three numeric keys representing the hundreds digit, the tens digit and the units digit, respectively.

4. The remote control unit according to claim 3, wherein the selected menu item is indicated by the hundreds digit, and the selected control operation is indicated by a combination of the tens digit and the units digit.

5. The remote control unit according to claim 1, wherein each of the numeric keys displays digits 0-10.

6. The remote control unit according to claim 1, wherein the display part is divided into two or more regions with each region to display at least one numeral.

7. The remote control unit according to claim 1, wherein as the electronic device enters the setup mode, an on screen display (OSD) control menu is displayed on a screen of the electronic device, and the control menu displays a numeral that must be inputted for executing the corresponding control menu.

8. A remote control unit comprising a key input part having an input key for controlling an electronic device, a memory for storing a control code for controlling the electronic device, a microcomputer for reading out and transmitting the control code stored in the memory depending on a signal inputted from the key input part, and an infrared transmitter for transmitting the control code in a form of an infrared signal depending on a control of the microcomputer,
    wherein the key input part includes:
        a plurality of numeric keys providing different multi-digit numerals depending on input of the numeric keys, and
        a display part for displaying a multi-digit numerals depending on the input of the numeric keys, wherein each of the numeric keys includes at least one touch screen to control the displaying of the multi-digit numerals on the display part, the display part displaying different multi-digit numerals according to a number of times that each of the numeric keys is pressed,
    wherein the multi-digit numeral is separated into two parts, a first one of the two parts corresponds to a menu item selected from among a plurality of menu items for controlling the electronic device, and a second one of the two parts corresponds to a control operation selected from among a plurality of control operations included in the selected menu items.

9. An electronic device comprising:
a key input part formed at an outer surface of the electronic device, for transmitting a control signal to a microcomputer of the electronic device depending on a key input of a user,
wherein the key input part includes:
  a plurality of numeric keys providing different multi-digit numerals depending on input of the numeric keys, and
  a display part for displaying a multi-digit numeral depending on input of the numeric keys, wherein the multi-digit numeral displayed on the display part is determined differently according to a number of times that each of the numeric keys is pressed,
wherein the multi-digit numeral is separated into two parts, a first one of the two parts corresponds to a menu item selected from among a plurality of menu items for controlling the electronic device, and a second one of the two parts corresponds to a control operation selected from among a plurality of control operations included in the selected menu items.

10. The electronic device according to claim 9, wherein each of the numeric keys includes at least one touch screen.

11. The electronic device according to claim 10, wherein the at least one touch screen is divided into two or more regions.

12. The remote control unit according to claim 8, wherein as the electronic device enters a setup mode, an on screen display (OSD) control menu is displayed on a screen of the electronic device, and the OSD control menu displays a numeral that must be inputted for executing the corresponding control menu.

13. The remote control unit according to claim 12, wherein the menu items include at least one of audio information, video information, channel information or additional information.

14. A method for controlling an electronic device, comprising:
  inputting a menu key formed on the electronic device or a remote control unit;
  allowing the electronic device to enter a setup mode depending on an input of the menu key;
  inputting a multi-digit numeral to a numeric key, wherein the multi-digit numeral is inputted to the numeric key of the electronic device or the remote control unit by pressing the numeric key a predetermined number of times; and
  inputting a confirm key of the electronic device or the remote control unit, and transmitting a control signal corresponding to the multi-digit numeral inputted to the numeric key to activate a setup of the electronic device,
wherein the numeral inputted to the numeric key is determined differently according to a number of times that the numeric key is pressed,
wherein the multi-digit numeral is separated into two parts, a first one of the two parts corresponds to a menu item selected from among a plurality of menu items for controlling the electronic device, and a second one of the two parts corresponds to a control operation selected from among a plurality of control operations included in the selected menu items.

15. The method according to claim 14, wherein as the electronic device enters the setup mode, an on screen display (OSD) control menu is displayed on a screen of the electronic device, and the control menu displays a numeral that must be inputted for executing the corresponding control menu.

16. The method according to claim 15, wherein the menu items include at least one of audio information, video information, channel information and additional information.

17. A method for controlling an electronic device, comprising:
  displaying a predetermined multi-digit numeral by separately pressing a numeric key a predetermined number of times for each of the digits of the multi-digit numeral, the numeric key being provided in a key input part of the electronic device or a remote control unit; and
  transmitting a control signal representing a numeral depending on an input of a confirm key to achieve a control operation of the electronic device,
wherein the displayed multi-digit numeral is determined differently according to a number of times that the numeric key is pressed,
wherein the multi-digit numeral is separated into two parts, a first one of the two parts corresponds to a menu item selected from among a plurality of menu items for controlling the electronic device, and a second one of the two parts corresponds to a control operation selected from among a plurality of control operations included in the selected menu items.

18. The method according to claim 17, wherein as the electronic device enters a setup mode, an on screen display (OSD) control menu is displayed on a screen of the electronic device, and the OSD control menu displays a numeral that must be inputted for executing the corresponding control menu.

19. The method according to claim 18, wherein the menu items include at least one of audio information, video information, channel information or additional information.

20. The remote control unit according to claim 7, wherein the menu items include at least one of audio information, video information, channel information or additional information.

* * * * *